United States Patent
Veith

(10) Patent No.: US 6,781,747 B2
(45) Date of Patent: Aug. 24, 2004

(54) METHOD FOR THE AMPLIFICATION OF WAVELENGTH DIVISION MULTIPLEX (WDM) SIGNALS IN A WDM TRANSMISSION SYSTEM, AS WELL AS OPTICAL AMPLIFIER, OPTICAL AMPLIFIER SYSTEM AND WDM TRANSMISSION SYSTEM FOR IT

(75) Inventor: Gustav Veith, Bad Liebenzell (DE)

(73) Assignee: Alcatel, Paris (FR)

( * ) Notice: Subject to any disclaimer, the term of this patent is extended or adjusted under 35 U.S.C. 154(b) by 131 days.

(21) Appl. No.: 10/155,960

(22) Filed: May 29, 2002

(65) Prior Publication Data

US 2002/0196527 A1 Dec. 26, 2002

(30) Foreign Application Priority Data

Jun. 21, 2001 (EP) .............................. 01440185

(51) Int. Cl.[7] .............................. H04B 10/17; H01S 3/30
(52) U.S. Cl. .................. 359/334; 359/134; 359/341.31
(58) Field of Search ............................. 359/134, 160, 359/334, 341.31

(56) References Cited

U.S. PATENT DOCUMENTS

| | | | | |
|---|---|---|---|---|
| 4,977,620 A | * | 12/1990 | Smith et al. ................. | 356/349 |
| 5,414,540 A | * | 5/1995 | Patel et al. .................. | 359/39 |
| 5,740,292 A | * | 4/1998 | Strasser ....................... | 385/37 |
| 6,049,414 A | | 4/2000 | Espindola et al. | |
| 6,151,160 A | | 11/2000 | Ma et al. | |
| 6,178,036 B1 | * | 1/2001 | Yao ............................. | 359/334 |
| 6,400,496 B1 | * | 6/2002 | Epworth .................... | 359/337.1 |
| 6,414,772 B2 | * | 7/2002 | Miyazaki .................... | 359/133 |
| 6,417,956 B1 | * | 7/2002 | Pedersen .................... | 359/334 |
| 6,535,328 B2 | * | 3/2003 | Yao ............................ | 359/334 |

FOREIGN PATENT DOCUMENTS

| | | |
|---|---|---|
| EP | 0 863 630 A2 | 9/1998 |
| EP | 0863630 * | 9/1998 |
| EP | 1018666 A1 | 7/2000 |
| WO | WO 9813957 | 4/1998 |

OTHER PUBLICATIONS

A. R. Chraplyvy et al, "Narrowband Tunable Optical Filter for Channel Selection in Densely Packed WEM Systems" Electronics Letters, IEE Stevenage, GB, Bd. 22, Nr. 20, Sep. 25, 1986, pp. 1084–1085, XP000471815.

N. A. Olsson et al, "Fibre Brilouin Amplifier with Electronically Controlled Bandwidth", Electronics Letters, IEE Stevenage, GB, Bd. 22, Nr. 9, Apr. 1, 1986, pp. 488–490, XP000709984.

* cited by examiner

Primary Examiner—Nelson Moskowitz
(74) Attorney, Agent, or Firm—Sughrue Mion, PLLC

(57) ABSTRACT

The invention concerns a method for the amplification of wavelength division multiplex (WDM) signals in a WDM transmission system, pump light being injected into an optical waveguide of the optical transmission system contrary to the transmission direction of the WDM signals, the pump light being designed so that at least one WDM signal is individually amplified by a stimulated Brillouin scattering process in the optical waveguide produced by the pump light, as well as an optical amplifier, an optical broadband amplifier system and a WDM transmission system for it.

15 Claims, 3 Drawing Sheets

METHOD FOR THE AMPLIFICATION OF WAVELENGTH DIVISION MULTIPLEX (WDM) SIGNALS IN A WDM TRANSMISSION SYSTEM, AS WELL AS OPTICAL AMPLIFIER, OPTICAL AMPLIFIER SYSTEM AND WDM TRANSMISSION SYSTEM FOR IT

BACKGROUND OF THE INVENTION

The invention is based on a priority application EP 01 440 185.5 which is hereby incorporated by reference. The invention concerns a method for the amplification of WDM signals in a WDM transmission system, wherein pump light is injected into an optical waveguide of the optical transmission system contrary to the transmission direction of the WDM signals.

Nowadays, modern optical transmission systems or networks primarily use the so-called wavelength division multiplex (WDM) method, in which a number of modulated optical carrier signals, whose frequencies differ from one another, are simultaneously transmitted in the optical waveguide. The mutual optical interference (crosstalk) of the individual modulated carriers is so small in this case that each of the said carriers can be considered as an independent wavelength channel or WDM channel. In modern WDM (transmission) systems with so-called dense wavelength division multiplex, a multiplicity of channels, for example 80 channels, are realized with a dense frequency pattern, for example, with an equidistant channel spacing of, for example, 50 GHz.

A problem of WDM transmission is the frequency-dependent attenuation of the transmitted light, as a result of which different WDM signals undergo differing attenuation. Likewise, optical amplifiers, for example erbium-doped fiber amplifiers, which are frequently used as intermediate amplifiers on a long transmission link, have a so-called gain spectrum; i.e., the WDM signals undergo a gain that is dependent on their respective frequencies. This transmission spectrum is dependent on, amongst other things, the temperature. Finally, differently progressing aging processes of the optical or opto-electrical elements of the WDM transmission system, for example, of laser diodes, or defects of optical connections, can result in significant intensity losses of individual WDM signals.

Various solution approaches are known from the prior art which are aimed at preventing drifting apart of the intensities of the WDM signals or at compensating intensity differences. Thus, the patent specification U.S. Pat. No. 6,049,414, entitled "Temperature-compensated rare earth doped optical waveguide amplifiers", discloses a system and a method for compensating the influence of temperature on the gain spectrum of a fiber amplifier by means of controllable, temperature-dependent optical filters. In the case of a further method, disclosed in the patent specification U.S. Pat. No. 6,151,160, the WDM signals as a whole first undergo broadband amplification and are subsequently distributed, in dependence on frequency, to different optical branches where each of the corresponding subsets of the WDM signals are individually amplified and subsequently undergo optical recombination.

However, the known methods for intensity equalization of WDM signals have various disadvantages. The disadvantage of compensation by means of controllable filters is that it may be necessary to accept high attenuation losses. Thus, for the purpose of equalizing the intensities, the intensities of the channels, other than the WDM channel with the least intensity, are lowered to the intensity of the latter.

The disadvantage of compensation by means of distribution to different optical branches consists in, firstly, a large circuitry requirement and, secondly, intensity losses due to the splitting of the light. The known methods are particularly unsuitable when individual WDM signals have a significantly lesser intensity compared with other channels due, for example, to aging of respective components.

SUMMARY OF THE INVENTION

The object of the invention is to create a method and equipment for performing the method, in particular, an optical amplifier, in which WDM signals selected from the totality of the transmitted WDM signals can be individually amplified without influencing of the other WDM signals.

The known methods for intensity equalization of WDM signals do not permit single or individual amplification of selected WDM signals. The fundamental concept of the invention consists in making technical use of a physical effect, by means of a so-called stimulated Brillouin scattering, which permits specific amplification of individual WDM signals.

The stimulated Brillouin scattering SBS is a sound wave scattering process which occurs when coherent electromagnetic waves, a so-called pump light, of high intensity is directed into an optical waveguide. The Brillouin scattering is a non-linear effect which increases superproportionally as the intensity increases. Due to interaction with the optical medium, acoustic waves are produced which result in a diffraction grating which moves at a certain speed in the same direction as the pump light in the waveguide. This pump light is consequently scattered, the greatest scatter portion being formed by a portion of the pump light which is scattered back in the direction opposite to that of the pump light. Due to the Doppler effect, the frequency of this backscattered wave is reduced by the sound frequency of the acoustic wave. This so-called Brillouin frequency is a characteristic quantity of the respective fiber material.

If a signal of the same wavelength as the backscattered pump light is then injected into the waveguide in the direction opposite to that of the pump light, the above-mentioned acoustic diffraction grating is substantially amplified. This results in an increase in the intensity of the backscattered pump light and, consequently, in amplification of the injected signal. These interrelationships are known from the prior art.

This effect, by which pump-light energy is transferred into a signal light, is now utilized according to the invention for the purpose of amplifying selected WDM signals, in that pump light with a given frequency spectrum is injected into the optical waveguide contrary to the transmission direction of the WDM signals. The frequency spectrum of a pump light for the distortionless amplification of a selected WDM signal is in this case offset, relative to the frequency spectrum of this WDM signal, by the above-mentioned Brillouin frequency. Since the Brillouin scattering is a narrowband effect, selected WDM signals can be individually amplified using the described method.

The advantage of the invention is that amplification of individual WDM signals can be performed selectively, while practically precluding influencing of other WDM channels. A further advantage is that the gain control is performed on the receiving side, i.e., a receiving device, for example, for processing or converting the WDM signals, can accurately adjust the intensity of one or more WDM signals such that the error rate on reading out of the corresponding data is minimized.

Further developments of the invention are disclosed by the dependent claims and the following description.

BRIEF DESCRIPTION OF THE DRAWINGS

The invention is described more fully below with reference to the accompanying drawings, wherein.

DETAILED DESCRIPTION OF EXEMPLARY EMBODIMENTS

Figure 1:
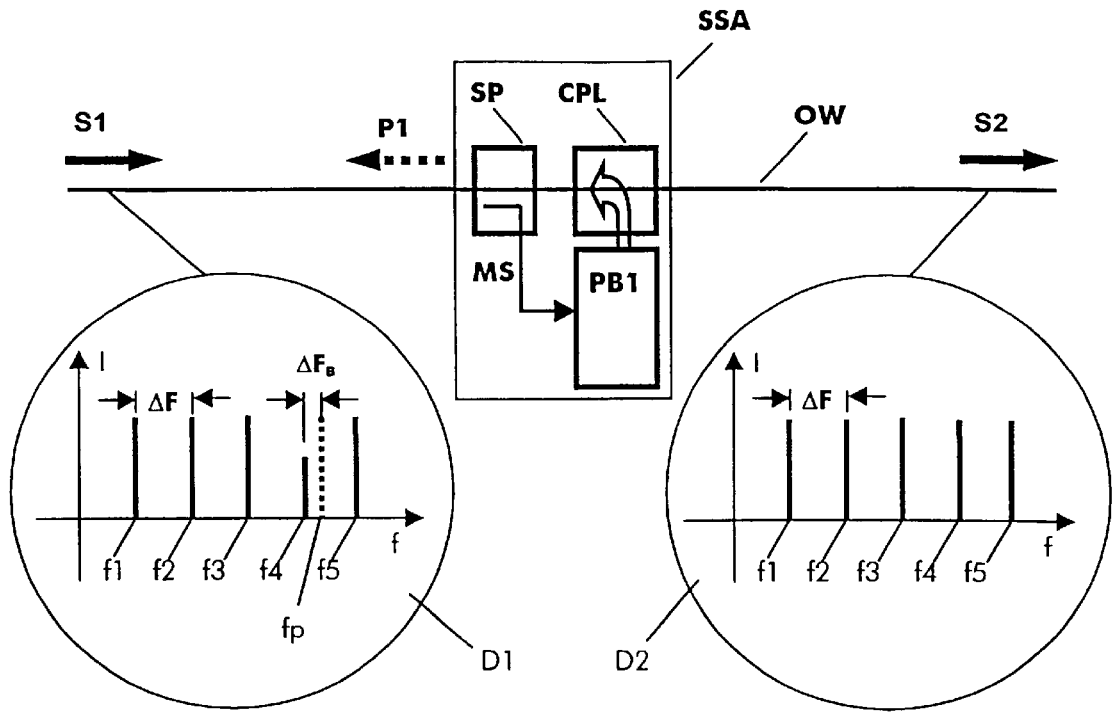
FIG. 1 shows, in schematic form, an arrangement with an optical amplifier, according to the invention, for the amplification of a selected WDM signal.

FIG. 1 shows an optical waveguide OW which passes via an optical amplifier SSA. The amplifier SSA consists of an optical splitter SP, a controlled singular pump-light source PB1 and an optical coupler CPL. Injected into the waveguide OW, on the input side of the amplifier SSA, is an optical input signal S1, consisting of a multiplicity of WDM signals with different carrier frequencies, from which a measurement signal MS is tapped, by means of the splitter SP, and supplied to the pump-light source PB1. This pump-light source generates a pump light P1 which is injected into the waveguide OW, via the coupler CPL, contrary to the direction of the input signal S1, for the purpose of amplification. An amplified optical signal or output signal S2 passes out of the amplifier SSA. A first diagram D1 shows, in schematic form, the intensity course I (ordinate) of the input signal S1 (continuous line) and of the pump light P1 (broken line) over the frequency f (abscissa). Five adjacent WDM signals, with their carrier frequencies f1–f5, are indicated schematically, and as an example, for the input signal S1 in this case. The carrier frequencies f1–f5 of these WDM signals each have an equidistant frequency spacing $\Delta F$. The frequency spectrum of the first pump light P1 is also indicated, as an example, with a singular narrowband frequency peak with a center frequency fp'. In this case, the center frequency fp of the pump light P1 is higher, by the Brillouin frequency $\Delta FB$, than the carrier frequency f4 of an exemplarily selected WDM signal to be amplified. For example, all WDM signals each have the same intensity, apart from the WDM signal having the carrier frequency f4, the intensity of which is reduced relative to the other WDM signals. A second diagram D2 shows schematically the intensity course I of the output signal S2, i.e., of the amplified input signal S1, over the frequency f. Here, all WDM signals have the same intensity.

Assumed in this case is a WDM system with equidistant frequency spacings $\Delta f$ of the carrier frequencies of the WDM channels, i.e., an equidistant frequency pattern. Thus, in the case of modern systems, the channel spacing is frequently 100 gigahertz, with a total of 40 WDM channels. Most recent WDM systems already have a channel spacing of only 50 gigahertz with 80 channels. However, the invention is not limited to WDM systems with an equidistant channel spacing. Thus, the invention can also be applied, for example, in the case of systems with alternating frequency spacings which are used, for example, in the case of a so-called vestigial side band filtering (VSB) for the purpose of optimizing the transmission capacity.

The splitter SP extracts a small portion of the intensity of the signal arriving at the amplifier SSA and supplies this signal component, as a measurement signal MS, to the pump-light source PB1. The amplifier SSA comprises a pump-light source for generating a pump light with a singular narrowband frequency peak, the pump light being generated by, for example, a laser diode. This amplifier SSA, also referred to here as a single-source amplifier SSA, serves to amplify strictly one selected WDM signal. For this purpose, the measurement signal MS is converted into an electrical signal by means of an opto-electrical converter, not represented here, and it is determined, for example, by means of an electronic evaluation device, not shown here, which of the WDM signals is to be amplified and which pumping power is required. For example, the WDM signal with the least intensity is selected as the WDM signal to be amplified. In the example shown here, an intensity deficit is ascertained for the WDM signal with the fourth carrier frequency f4. The evaluation unit sends a control signal to the pump-light source PB1 to generate a pump light P1, of a given intensity, having a center frequency fp which is higher, by the Brillouin frequency $\Delta FB$, than the carrier frequency f4 of the WDM signal to be amplified.

The intensity of the pump light P1 is adjusted, as described, in a closed-loop control circuit. To prevent oscillations of the pump-light intensity, the intensity measurement is determined over a time range substantially greater than the transmission rate of the WDM signals. As a consequence, in particular, short-term intensity fluctuations resulting from the modulation remain disregarded. The pump light P1 is injected into the waveguide OW via the coupler CPL, contrary to the signal transit direction of the input signal S1. In order that none, or very little, of the signal energy of the useful signal is decoupled via the coupler CPL, i.e., no signal energy is lost, the coupler CPL can be designed as a wave-selective coupler. Alternatively, the coupler CPL can be designed as an optical circulator.

As described above, the pump light P1 effects amplification of the particular signal whose frequency is lower, by the Brillouin frequency $\Delta FB$, than the frequency of the pump signal. This Brillouin frequency $\Delta FB$ is a characteristic quantity and, for signals in the wavelength range of 1550 nanometers in silica glass, is approximately 11.1 gigahertz. The amplification by a stimulated Brillouin scattering constitutes a narrowband process in which a frequency range of approximately only 16 megahertz of the signal to be amplified is taken up by the amplification.

For an advantageous application of the amplifier described above, it is important that each WDM signal out of the multiplicity of WDM signals can be amplified. For this purpose, a tunable pump laser is used as the pump-light source PB1. This tunable pump laser can then be tuned to any desired frequency, within the frequency range of the WDM signals or the WDM signal band or a portion of the WDM signal band, for the purpose of amplifying a selected WDM signal. The WDM signal band comprises, for example, the so-called C-band with a wavelength range of 1530–1565 nanometers and/or the so-called L-band with a wavelength range of 1570–1610 nanometers.

In an alternative embodiment, the pump light P1 is obtained, through frequency conversion, from the WDM signal to be amplified, in that an appropriate optical circuit is used to generate, from the selected WDM signal, a signal increased by the Brillouin frequency ΔFB and this signal is injected back, as a pump light P1, into the waveguide OW.

The embodiments described hitherto permit only the amplification of one selected WDM signal. Such an amplifier is particularly suitable when an individual WDM channel of a WDM system becomes degraded due to, for example, component faults, optical coupling errors or premature aging of particular components. If, however, several WDM channels become degraded simultaneously, i.e., there is a need to simultaneously amplify several selected WDM signals, it is necessary to generate a corresponding pump-light signal with several frequencies. Embodiments for this purpose are described in the description of the following FIG. 2.

Figure 2:
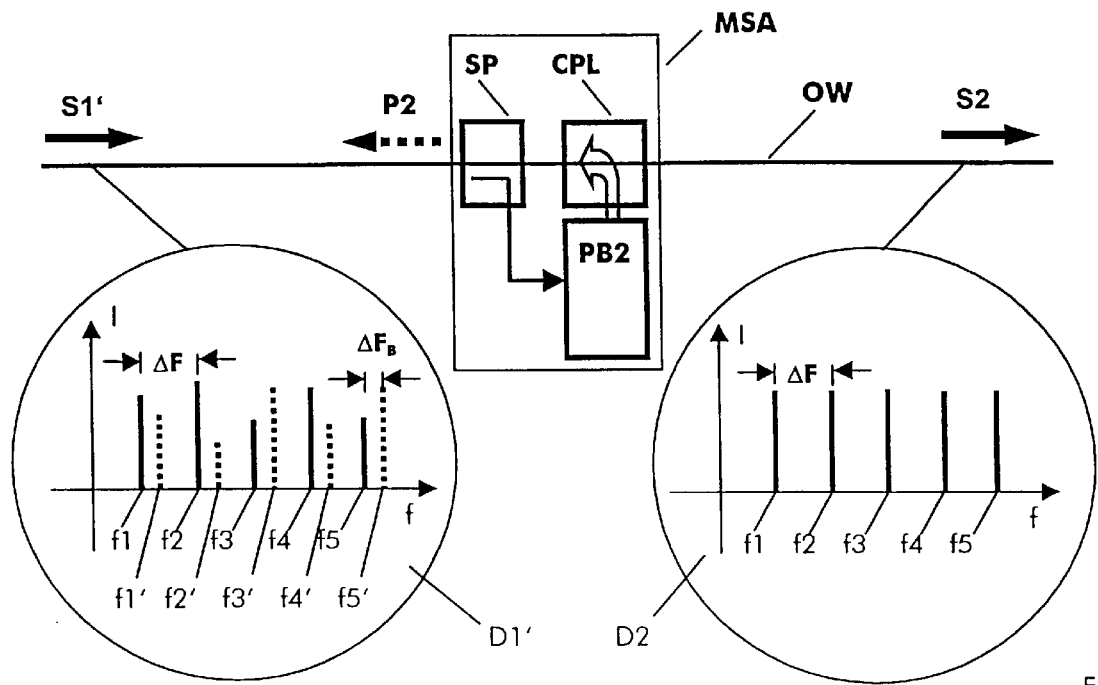
FIG. 2 shows, in schematic form, an arrangement with an amplifier, according to the invention, for the simultaneous, individual amplification of several WDM signals

FIG. 2 shows an arrangement, similar to that in FIG. 1, in which the amplifier SSA is replaced by an optical amplifier, referred to here as a multi-source amplifier MSA. Unlike the (single-source) amplifier SSA, the multi-source amplifier MSA comprises a multiple pump-light source PB2. Injected into the waveguide OW on the input side is a modified input signal S1', in which the intensities of the WDM signal have different values. Instead of the pump light P1 with a marked frequency peak, in this case an expanded pump light P2 is generated, having several narrowband frequency peaks corresponding to the number of WDM signals to be amplified. As in FIG. 1, the output signal S2 has identical intensity values for all WDM signals. A first modified diagram D1' shows, in schematic form, the intensity course I of the modified input signal S1' and of the expanded pump light P2 over the frequency f. Again in this case, as an example and in schematic form, five WDM signals, with their frequency peaks, are indicated for the modified input signal S1' by continuous lines. The carrier frequencies f1–f5 of these WDM signals again each have an equidistant frequency spacing ΔF; the intensity values, however, differ from one another. The frequency spectrum of the expanded pump light P2, with frequency peaks with center frequencies f1'–f5', is indicated by broken lines. These center frequencies f1'–f5' are respectively higher in this case, by the Brillouin frequency ΔFB, than the carrier frequencies f1–f5.

In the example shown here, all WDM signals are amplified, each WDM signal being amplified differently, according to its intensity ascertained in the amplifier MSA. The expanded pump light P2 thus has a line spectrum with different intensities for each line. This expanded pump light is generated by, for example, a number of laser diodes which are fixed to different, defined frequency values. Alternatively, the expanded pump light P2 is obtained, through frequency conversion, from the WDM signals to be amplified, according to the embodiment described in relation to FIG. 1.

In a further variant, several pump-light sources, for example laser diodes, are again used to generate a pump light. However, the number of these pump-light sources is less than the number of the WDM channels of the WDM system. In this case, some or all of the pump-light sources can be tuned in respect of their frequency. Use of such an amplifier permits the simultaneous amplification of several WDM signals without the need to provide a separate pump-light source for each WDM channel. This represents a useful compromise for WDM systems with a multiplicity of WDM channels, for example, 80 channels in the case of WDM systems that now already exist, particularly provided that this amplifier is used primarily for compensating intensity losses caused by component faults or coupling errors. As described, such faults often affect individual WDM channels and frequently result in a substantial reduction of the intensity of the affected WDM signals, which cannot be satisfactorily compensated by means of conventional amplifiers. The degradation of individual channels can be corrected on the receiving side without affecting the other channels, thus avoiding shutdown of the system.

As the modulation frequency increases, i.e., as the bit-rate of the information contained in a WDM signal increases, the width of the corresponding frequency spectrum is increased. Hitherto in this document, line-type spectra, i.e., of narrowband WDM signals, have been assumed for reasons of simplification. This approach can be adopted provided that the modulation frequency of a WDM signal is small, in particular, substantially less than the frequency spacing ΔF of the carrier frequencies. However, in the case of modern systems with high bit-rates, for example, up to 20 gigahertz per WDM channel, line-type spectra can no longer be assumed. As described above, a stimulated Brillouin scattering constitutes a narrowband process in which only a very narrow frequency range around the pump-light frequency is taken up. Since the spectrum of a pump light generated by, for example, a laser diode, has only a very narrow frequency range, only a very small portion of a broadband WDM signal would be taken up by amplification through the Brillouin effect. Such a narrowband amplification of a broadband signal would result in a distortion of the amplified signal, so that fault-free demodulation, i.e., recovery of the information signal, would be rendered more difficult. Such an amplification would also have only a very limited efficiency. A solution to this problem is described in relation to the following FIG. 3.

Figure 3:
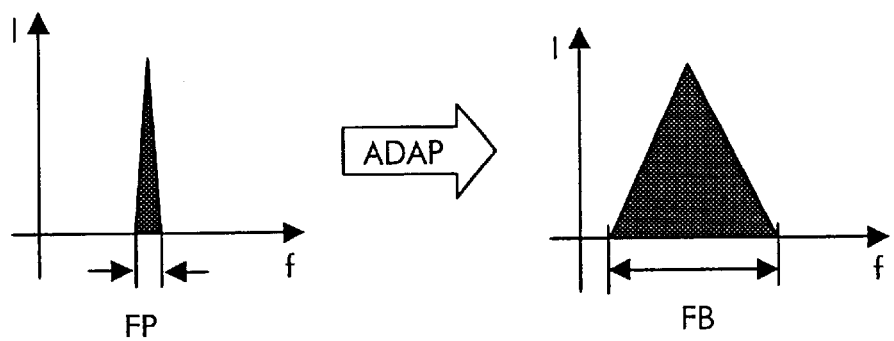
FIG. 3 shows a diagram for the frequency adaptation of a pump signal.

The left-hand diagram of FIG. 3 shows the course of the intensity I of a narrowband pump light over the frequency f. The spectrum of this pump light is represented schematically by a narrow triangle with a base width or line width FP. The right-hand diagram shows the course of the intensity I of an adapted pump light over the frequency f. This signal, likewise represented as a triangle, has the adapted base width or adapted pump-light width FB. The arrow ADAP represents a modification process for an adaptation of a narrowband pump light to the signal bandwidth of a WDM signal to be amplified.

Semiconductor laser diodes are preferably used to generate a pump light. These laser diodes emit narrowband light, with a line width FP of, for example, approximately 10 megahertz. In the most modern WDM systems, the signal bandwidth of a WDM signal covers a large portion of the reserved frequency range, for example, 20 gigabits in a WDM system with a frequency pattern with 100 gigabits. For the purpose of optimum amplification of a WDM signal, the line width FP of the narrowband pump light must be adapted to the signal bandwidth. In a first embodiment, the pump light is pulsed for this purpose, i.e., respectively switched on and switched off at repeated time intervals, as a result of which the pulsed pump light emits in a larger spectral range. The switching times are determined so that the pulsed pump light covers the entire bandwidth FB of the WDM signal to be amplified. In an advantageous alternative, the narrowband pump light is modulated with a so-called digital pseudo-random binary signal, PRBS. This random signal has the same signal-element frequency and the same signal form as the WDM signal to be amplified, i.e., the modulation type and the modulation speed are identical. The bandwidth FB of the modulated pump light is thus optimally adapted to the bandwidth of the WDM signal to be amplified.

Figure 4A:
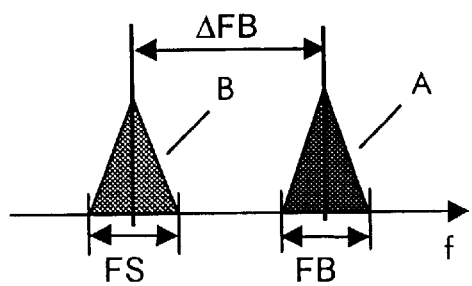
FIG. 4a shows, in schematic form, the spectrum of a pump signal for the complete amplification of a WDM signal.

To elucidate this, the spectra are shown in FIG. 4a, using the example of a selected WDM signal and the adapted pump light, respectively represented by the triangles B and A with the base width, i.e., signal width FS and pump-light bandwidth FB. For the purpose of optimum amplification of the WDM signal, both bandwidths FS and FB are identical. The carrier frequency of the pump light is in this case higher, by the Brillouin frequency ΔFB, than the carrier frequency of the WDM signal.

Figure 4B:
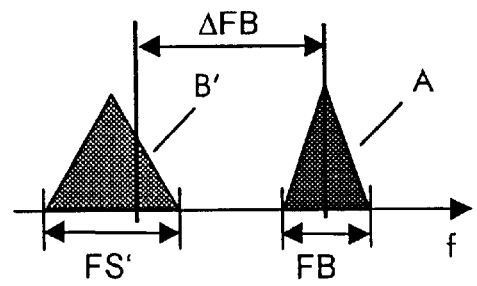
FIG. 4b shows, in schematic form, the spectrum of a pump signal for the partial amplification of a WDM signal.

FIG. 4b corresponds to FIG. 4a, but in this case the bandwidth of the WDM signal, represented by a triangle B' with a signal width FS', is greater than the pump-light width FB. Since the spectrum of a modulated carrier is symmetrical, the information of a sideband is sufficient, in principle, for complete recovery of the information signal. For this purpose, a transmitter suppresses respectively one sideband of the WDM signals and groups the WDM signals correspondingly closer together. For the purpose of adapting a narrowband pump light to such a WDM signal, a modulation rate is selected for it which is lower than the modulation rate of the WDM signal, for example, half the rate. Accordingly, the frequency difference between the carrier frequency of the pump light and the carrier frequency of the WDM signal is different from the Brillouin frequency. Consequently, it is exclusively or substantially only the desired sideband that is then amplified.

Figure 5:
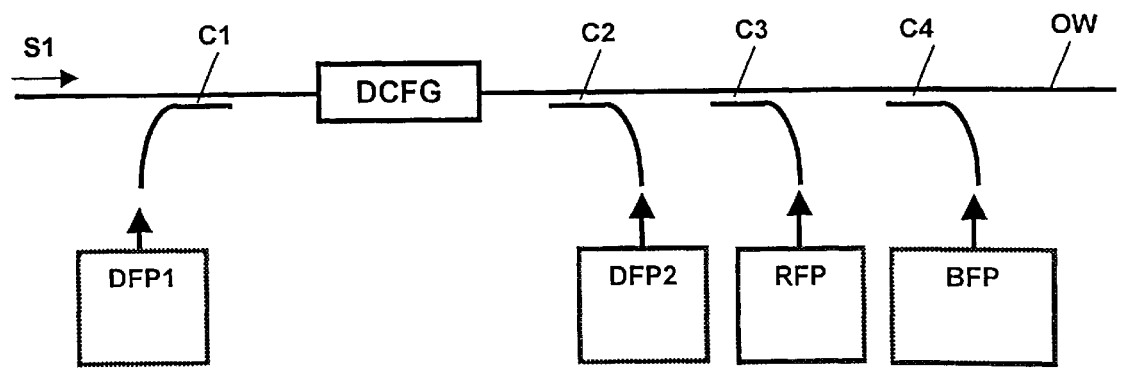
FIG. 5 shows, in schematic form, an amplifier, according to the invention, as part of an optical amplifier system according to the invention.

FIG. 5 shows, in schematic form, a further advantageous embodiment of one of the above-mentioned amplifiers with stimulated Brillouin scattering for the amplification of selected WDM signals, referred to hereinafter, in brief, as a Brillouin amplifier, as part of an optical broadband amplifier system AS, which serves simultaneously for the amplification, dispersion compensation and controlled gain equalization of WDM signals. Represented for this purpose is a waveguide OW with an active fiber element DCFG. The signal transit direction of an input signal S1 which, as described in FIG. 1, consists of different WDM signals of a WDM system, goes from left to right. To the left of the active fiber element DCFG, pump light of a first fiber-amplifier pump-light source DFP1 is injected in the signal transit direction, for example, by means of a first coupler C1. To the right of the active fiber element DCFG, as an example, the pump lights of a second fiber-amplifier pump-light source DFP2, a Raman amplifier pump-light source RFP and a Brillouin amplifier pump-light source BFP are injected in succession, via the couplers C2, C3 and C4 respectively, contrary to the signal transit direction.

The pump light of the said pump-light sources in each case produces a given gain effect in the active fiber element DCFG. The pump light of the fiber-amplifier pump-light sources DFP1 and DFP2 and the pump light of the Raman amplifier pump-light source RFP respectively effect a global amplification of all WDM signals or of a subset of these WDM signals of the input signal S1. The dispersion caused by transmission over long distances is simultaneously compensated in the active fiber element. As previously explained, the pump light of the Brillouin amplifier pump-light source BFP permits equalization of the intensities of individual WDM signals which, particularly in the case of significant degradation, i.e., in the case of significant intensity loss of an individual WDM signal, can no longer be satisfactorily compensated by means of the other amplifiers.

The active fiber element DCFG consists of a fiber coil which, in a first variant, consists of three fiber pieces connected in optical series. A first fiber piece is a fiber with, for example, an erbium-doped fiber core. This fiber piece, together with the fiber-amplifier pump-light sources DFP1 and DFP2, constitutes a so-called doped fiber amplifier. A second fiber piece consists of a non-doped amplification fiber which, together with the Raman amplifier pump-light source RFP, constitutes a so-called Raman amplifier. The Raman amplification is a non-linear effect; the amplification increases quadratically with the intensity density of the pump light. Consequently, in order to achieve a high intensity density for a given intensity of the pump light source, a fiber core with a smallest possible cross sectional area is selected for this fiber part, i.e., a thin-core fiber is used. A third fiber piece consists of a fiber with an inverse dispersion behavior for dispersion compensation of the transmission fiber.

In an advantageous variant, the effects described above are combined, i.e., two or three of the described effects are achieved by means of one physical fiber piece. Thus, for example, the fiber piece for the Raman amplification and the fiber piece for the dispersion compensation can consist of one physical fiber piece which has a thin core and an inverse dispersion behavior. All three effects can also be produced in one physical fiber piece, the fiber piece described in the last sentence then also being appropriately doped with an actively amplifying material.

Figure 6:
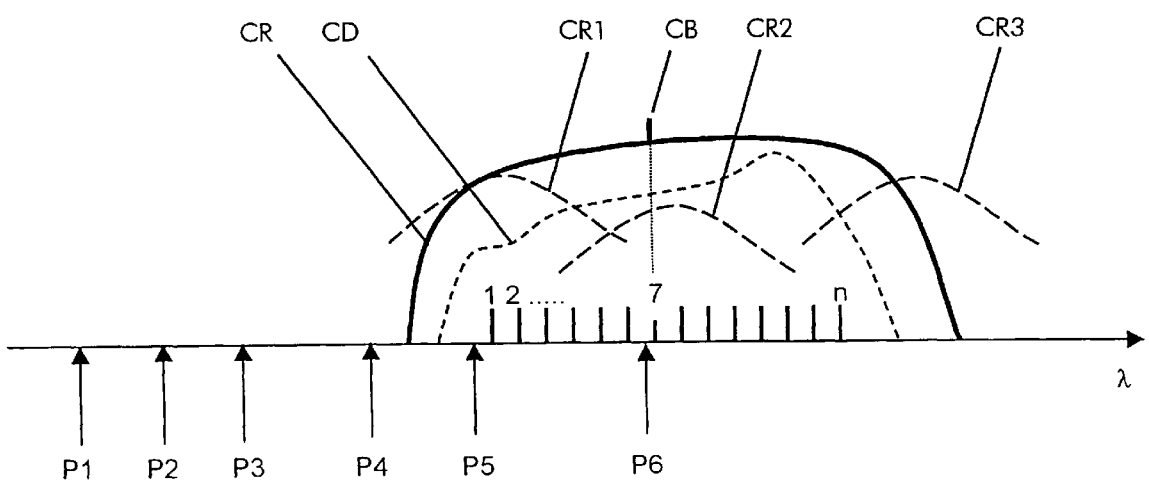
FIG. 6 shows, in schematic form and as an example, a diagram with gain curves and pump wavelengths of the optical amplifier system according to the invention.

FIG. 6 shows, as an example, a diagram with the spectra or gain curves of the individual amplifiers or gain effects of the optical amplifier system AS according to the invention, and the wavelengths of the pump light from the corresponding pump-light sources DFP1, DFP2, RFP and BFP of FIG. 5. For this purpose, a number of n WDM signals 1–n are indicated schematically on a wavelength axis λ. In this case, as an example, the seventh WDM signal 7 is degraded. Indicated from left to right is a fiber gain curve CD of a doped fiber amplifier, a first Raman gain curve CR1, a Brillouin gain curve CB, a second Raman gain curve CR2 and a third Raman gain curve CR3. A resultant gain curve CR represents the resultant, i.e., additive, effect of all gain effects in the active fiber element DCFG.

Indicated from left to right below the wavelength axis λ, as an example, are the wavelengths for the pump lights P1–P6 of the pump-light sources DFP1, DFP2, RFP and BFP from FIG. 5. In this case, the wavelengths of the pump lights P1–P4 are outside the spectrum of the resultant gain curve CR (out of band), and the wavelengths of the pump lights 5–6 are inside this spectrum (in band). The first pump light P1 is in this case generated by the first fiber-amplifier pump-light source DFP1, the second pump light P2 is generated by the second fiber-amplifier pump-light source DFP2, the third, fourth and fifth pump lights P3–P5 are generated by the Raman amplifier pump-light sources RFP and the sixth pump light P6 is generated by the Brillouin amplifier pump-light source BFP.

The fiber gain curve CD comprises all WDM signals, but effects a different amplification, dependent on the wavelength. The Raman gain curves CR1–CR3, produced by the pump-light sources P3–P5, each comprise a portion of the WDM signals, and the Brillouin gain curve CB, represented here as a narrowband peak, comprises the seventh WDM signal, selected as an example. The center frequency of this gain curve CB is in this case offset, relative to the carrier frequency of the seventh WDM signal, by the Brillouin frequency ΔFB described above. Apart from a peak at the gain effect CB produced by the Brillouin amplifier, the resultant gain curve CR is approximately flat, as required, in the range of the WDM signals 1–n, i.e., the entire broadband amplification system AS achieves an amplification, equalization and dispersion compensation of all WDM signals.

What is claimed is:

1. A method for the amplification of wavelength division multiplex signals in a WDM transmission system, wherein pump light is injected into an optical waveguide of the optical transmission system contrary to the transmission direction of the WDM signals and wherein the pump light has a frequency spectrum such that at least one selected WDM signal is individually amplified, independently of at least one non-selected WDM signal, by a Brillouin scattering process in the optical waveguide produced by the pump light, wherein the pump light is generated by means of a narrowband pump-light source and adapted, by means of adaptation process, to a bandwidth of WDM signals to be amplified; and wherein said adaptation process comprises modulation by pseudorandom signals and pulsing said pump light into a switched on and a switched off state.

2. The method according to claim 1, wherein, for the purpose of equalization of different intensities of the WDM signals, the intensity of the WDM signals is measured and a corresponding pump light is determined for the specific individual amplification of the WDM signals.

3. A method according to claim 2, wherein the pump light is adapted through a modulation with a pseudo-random signal which has the same modulation type and modulation rate as a WDM signal to be amplified.

4. An optical amplifier for a wavelength division multiplex transmission system comprising:

injection means for injecting a pump light into the optical waveguide contrary to the transmission direction of the WDM signals;

pump-light generating means which are designed in such a manner that a pump light for the individual amplification of at least one selected WDM signal by means of a stimulated Brillouin scattering process can be generated independently of at least one of the non-selected WDM signals; and adaptation means for adapting the bandwidth of a pump light or pump-light component for amplifying a WDM signal to the bandwidth of this WDM signal, and wherein said adaptation process comprises pulsing said pump light into a switched on and a switched off state.

5. The optical amplifier according to claim 4, further comprising measurement means for measuring the intensity values of WDM signals and evaluation means for determining a control signal for controlling the pump-light generating means, the control signal being designed so that the pump-light generating means generates a pump light for equalizing the intensities of the said WDM signals.

6. An optical broadband amplifier system for the amplification, dispersion compensation and intensity equalization of the WDM signals of a WDM transmission system, with an optical amplifier according to claim 4.

7. The optical broadband amplifier system according to claim 6, further comprising an active fiber element and corresponding pump-light source acting on the fiber element.

8. A WDM transmission system with an optical amplifier according to claim 4, or according to claim 6.

9. A method for the amplification of wavelength division multiplex signals in a WDM transmission system, wherein pump light is injected into an optical waveguide of the optical transmission system contrary to the transmission direction of the WDM signals and wherein the pump light has a frequency spectrum such that at least one selected WDM signal is individually amplified, independently of at least one non-selected WDM signal, by a Brillouin scattering process in the optical waveguide produced by the pump light, wherein the pump light is generated by means of a narrowband pump-light source and adapted, by means of adaptation process, to a bandwidth of WDM signals to be amplified;

wherein said adaptation process comprises pulsing said pump light into a switched on and a switched off state; and wherein said pump light is adapted through modulation with a pseudo-random signal which has the same modulation type and modulation rate as a WDM signal to be amplified.

10. An optical amplifier for a wavelength division multiplex transmission system comprising:

injection means for injecting a pump light into the optical waveguide contrary to the transmission direction of the WDM signals;

pump-light generating means which are designed in such a manner that a pump light for the individual amplification of at least one selected WDM signal by means of a stimulated Brillouin scattering process can be generated independently of at least one of the non-selected WDM signals; and adaptation means for adapting the bandwidth of a pump light or pump-light component for amplifying a WDM signal to the bandwidth of this WDM signal, wherein said adaptation process comprises pulsing said pump light into a switched on and a switched off state; and wherein the pump light is adapted through a modulation with a pseudo-random signal which has the same modulation type and modulation rate as a WDM signal to be amplified.

11. The method according to claim 2, further comprising individually amplifying one selected WDM signal by a single source amplifier.

12. The method according to claim 1, further comprising injecting the pump light into the optical waveguide by a plurality of pump light sources.

13. The method according to claim 1, further comprising injecting the pump light in the optical waveguide via a coupler wherein said coupler is at least one of a wave-selective coupler or an optical circulator.

14. The method according to claim 2, wherein said pump-light source is a tunable pump laser wherein said tunable pump laser can be tuned to any desired frequency within a frequency range of the WDM signals.

15. The method according to claim 10, wherein the number of pump light sources is less than the number of WDM channels of said WDM transmission system.

* * * * *